US011822458B1

(12) United States Patent
Kanani et al.

(10) Patent No.: US 11,822,458 B1
(45) Date of Patent: Nov. 21, 2023

(54) EXECUTION-TIME TELEMETRY REPORTING USING OBJECT MODEL

(71) Applicant: Microsoft Technology Licensing, LLC, Redmond, WA (US)

(72) Inventors: Pritesh Rajesh Kanani, Seattle, WA (US); Siunie Aquawati Sutjahjo, Seattle, WA (US); James Feore, University Place, WA (US); Wei Zhong, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/902,146

(22) Filed: Sep. 2, 2022

(51) Int. Cl.
*G06F 9/44* (2018.01)
*G06F 11/36* (2006.01)
*G06F 11/30* (2006.01)

(52) U.S. Cl.
CPC ........ *G06F 11/3612* (2013.01); *G06F 11/302* (2013.01); *G06F 11/3072* (2013.01)

(58) Field of Classification Search
None
See application file for complete search history.

(56) References Cited

U.S. PATENT DOCUMENTS

| | | | | |
|---|---|---|---|---|
| 7,886,278 B2* | 2/2011 | Stulski | ............... | G06F 11/3612 717/131 |
| 9,588,869 B2* | 3/2017 | Kumar | ............... | G06F 11/3612 |
| 10,884,895 B2* | 1/2021 | McHugh | ............ | G06F 11/3612 |
| 11,061,800 B2* | 7/2021 | Prakash | ............. | G06F 11/3692 |
| 2010/0122239 A1* | 5/2010 | Neufeld | ............. | G06F 11/3612 717/131 |
| 2018/0288190 A1* | 10/2018 | Lyons | ................. | G06F 11/3452 |

\* cited by examiner

*Primary Examiner* — Qamrun Nahar
(74) *Attorney, Agent, or Firm* — WORKMAN NYDEGGER

(57) ABSTRACT

The execution-time reporting of telemetry of execution of a software program. Subscribers submit subscriptions to telemetry of the software program. As each subscription is received, the telemetry scope of the subscription is evaluated to determine what portion of an object model is to be augmented. The augmented portion will include portion(s) related to the scope of telemetry subscribed to in the subscription. Thereafter, that portion of the object model is indeed augmented as execution of the computer program proceeds further. Subsequently, telemetry reports are generated for a subscription based on the interpretation of a defined subscription-specific portion of the object model.

20 Claims, 7 Drawing Sheets

EXECUTION-TIME TELEMETRY REPORTING USING OBJECT MODEL

BACKGROUND

Computer software sometimes has errors, flaws or faults in its design, development, or operation that causes the software to produce an incorrect or unexpected result, or to behave in unintended ways. Such errors, flaws or faults will be referred to herein as "programming issues" or "issues". Programming issues are a common concern for software developers, and a common annoyance for software users. Such programming issues include, for example, malfunctions, crashes, inoperable features, poor performance, unhandled error conditions, and so forth. Issues may be caused by the program itself, or by a piece of software or hardware used by the program, such as an operating system, processor, memory, network connection, remote service, database, peer user's software, peer user's device, third party library, and so forth.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with the principles described herein, the execution-time reporting of telemetry of execution of a software program is described. Subscribers submit subscriptions to telemetry of the software program. As each subscription is received, the telemetry scope of the subscription is evaluated to determine what portion of an object model is to be augmented. The augmented portion will include portion(s) related to the scope of telemetry subscribed to in the subscription. Thereafter, that portion of the object model is indeed augmented as execution of the computer program proceeds further. That augmentation of the portion could include extending the object model from that portion, and/or refinement of the portion with additional data.

Subsequently, telemetry reports are generated for a subscription based on the interpretation of a defined subscription-specific portion of the object model. That is, while execution of the software program is still proceeding, the augmented portion of the object model is evaluated to determine telemetry of the type subscribed to in the associated subscription. Based on a determination of whether that telemetry is within the scope of the subscription, the telemetry is then reported to the subscriber. The telemetry may be used to simply monitor performance of the software program, but may also be used to troubleshoot or automatically resolve any issues stemming from variation of the telemetry from expected normal behavior. The object model may then be used to perform that troubleshooting or automatic resolution.

Because the object model is augmented judiciously in those portions that relate to a subscription, and need not be augmented in other areas, the processing required to augment the object model is roughly proportional to the number of subscriptions, and not to the overall complexity of the software program. Furthermore, because interpretation of the object model for any given subscription is primarily in that portion of the object model that was augmented for that subscription, the computer resources dedicated to interpretation of the object model is also roughly proportional to the number of subscriptions, and not to the overall complexity of the program. In addition, to the extent that troubleshooting or automatic problem resolution is performed, the object model can be quickly navigated since the portion of the object model that is augmented is relevant to the encountered problem, and thus a starting point for navigation of the object model is already known.

Thus, even for very complex programs, execution telemetry may be gathered and reported quickly to the subscriber, while the software program is still executing, and potentially in real-time. Furthermore, to the extent that troubleshooting or resolving of issues are initiated from monitoring the telemetry, the root cause of any problems may be identified more quickly, and problems with execution of the software program may be more short-lived.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

In accordance with the principles described herein, the execution-time reporting of telemetry of execution of a software program is described. Subscribers submit subscriptions to telemetry of the software program. As each subscription is received, the telemetry scope of the subscription is evaluated to determine what portion of an object model is to be augmented. The augmented portion will include portion(s) related to the scope of telemetry subscribed to in the subscription. Thereafter, that portion of the object model is indeed augmented as execution of the computer program proceeds further. That augmentation of the portion could include extending the object model from that portion, and/or refinement of the portion with additional data.

Subsequently, telemetry reports are generated for a subscription based on the interpretation of a defined subscription-specific portion of the object model. That is, while execution of the software program is still proceeding, the augmented portion of the object model is evaluated to determine telemetry of the type subscribed to in the associated subscription. Based on a determination of whether that telemetry is within the scope of the subscription, the telemetry is then reported to the subscriber. The telemetry may be used to simply monitor performance of the software program, but may also be used to troubleshoot or automatically resolve any issues stemming from variation of the telemetry from expected normal behavior. The object model may then be used to perform that troubleshooting or automatic resolution.

Because the object model is augmented judiciously in those portions that relate to a subscription, and need not be augmented in other areas, the processing required to augment the object model is roughly proportional to the number of subscriptions, and not to the overall complexity of the software program. Furthermore, because interpretation of the object model for any given subscription is primarily in that portion of the object model that was augmented for that subscription, the computer resources dedicated to interpretation of the object model is also roughly proportional to the number of subscriptions, and not to the overall complexity of the program. In addition, to the extent that troubleshooting or automatic problem resolution is performed, the object model can be quickly navigated since the portion of the object model that is augmented is relevant to the encountered problem, and thus a starting point for navigation of the object model is already known.

Thus, even for very complex programs, execution telemetry may be gathered and reported quickly to the subscriber, while the software program is still executing, and potentially in real-time. Furthermore, to the extent that troubleshooting or resolving of issues are initiated from monitoring the telemetry, the root cause of any problems may be identified more quickly, and problems with execution of the software program may be more short-lived.

Figure 1:
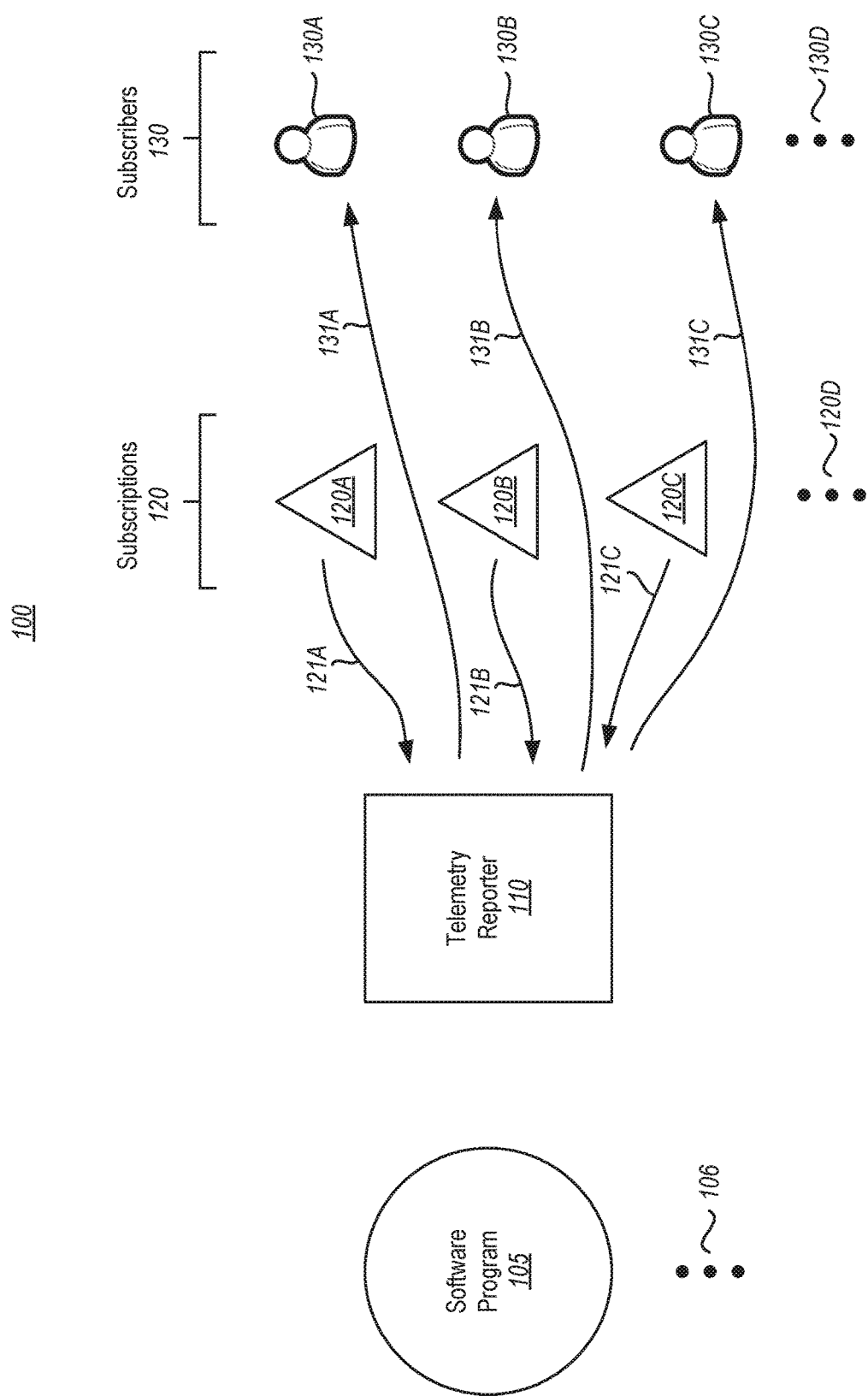
FIG. 1 illustrates aspects of the configuration and operation of a computing system for reporting telemetry of a software program to appropriate subscribers, in accordance with the principles described herein.

FIG. 1 illustrates aspects of the configuration and operation of a computing system 100 for reporting telemetry of a software program to appropriate entities. As shown in FIG. 1, the illustrative system 100 includes a software program 105. The software program 105 is referred to as a "software program" herein for brevity and clarity. However, the software program 105 can be any executable system, including hardware, firmware, field programmable gate array (FPGA), or the like, or a combination thereof. The software program 105 may be a distributed software program.

As an example, the software program 105 may be executed in a distributed fashion between a service in a cloud computing system with components of the software program 105 also potentially executed on one or more client computing systems. Even if the software program 105 is exceedingly complex, the principles described herein allow for timely reporting of execution telemetry of the software program 105, even whilst the software program 105 is still executing, and even potentially in real-time. In one example, the software program 105 is a video conferencing application in which multiple users participate via their respective client computing system, and a video conferencing service interfaces with each of the client computing systems to provide the video conferencing experience.

The software program 105 is associated with a telemetry reporter 110, which may operate on another server or another remote computing device as compared to the software program 105. The telemetry reporter 110 is configured to receive subscriptions to telemetry of the software program 105, and provide appropriate telemetry reports to respective subscribers. In one example, the telemetry reporter 110 is an executable component, such as the executable component 806 described below with respect to FIG. 8. As represented by the ellipsis 106, the telemetry reporter 110 may receive subscriptions and provide telemetry reports for any number (from one to many) of software programs.

The telemetry reporter 110 may receive any number of subscriptions 120 to telemetry scope of execution of the software program 105. As an example, in FIG. 1, the subscriptions 120 include three subscriptions 120A, 120B and 120C. However, the ellipsis 120D represents that the telemetry reporter 110 may receive any number of subscriptions to telemetry scope of execution of the software program 105, and that the number of active subscriptions to telemetry scope of execution of the software program may increase or decrease over time. The subscription is a data structure, but in the drawings, the subscriptions will often be symbolized as being triangular.

The subscriptions 120 are each supplied by (or on behalf of) subscribers 130 who are each to receive telemetry reports of the execution telemetry of the software program, where that execution telemetry is within the telemetry scope of the respective subscription. For instance, subscriber 130A is to receive telemetry reports that include telemetry that is within the telemetry scope of the subscription 120A. Likewise, subscriber 130B is to receive telemetry reports that include telemetry that is within the telemetry scope of the subscription 120B. Also, subscriber 130C is to receive telemetry reports that include telemetry that is within the telemetry scope of the subscription 120C. Ellipsis 130D represents that there may be any number of subscribers that receive telemetry that is within the respective telemetry scope of their respective subscriptions.

A subscriber may be any entity to which a telemetry report may be sent is similarly contemplated and is within the scope of all examples disclosed herein. For example, a telemetry report may be sent to any suitable entity, such as but not limited to, an individual, an artificial intelligence, a team, a corporation, an organization, or the like, or combinations of the same. Thus, the term "subscriber" is intended to be interpreted broadly as any entity that can receive and process a telemetry report.

Figure 2:
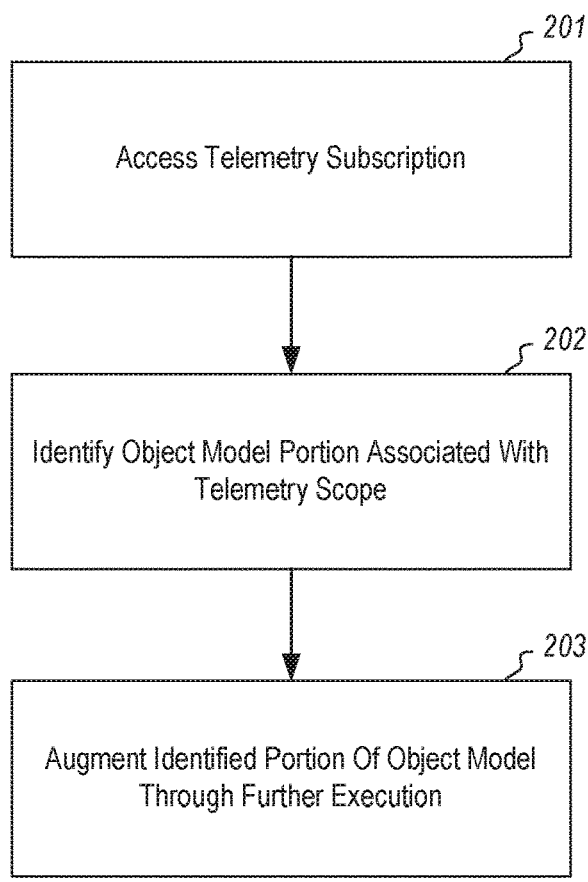
FIG. 2 illustrates a flowchart of a computer-implemented method for augmenting an object model in response to accessing a subscription, in accordance with the principles described herein.

FIG. 2 illustrates a flowchart of a computer-implemented method for augmenting an object model in response to accessing a subscription. As the method 200 may be performed in the environment 100 of FIG. 1 by the telemetry reporter 110 of FIG. 1. Accordingly, the method 200 of FIG. 2 will now be described with frequent reference to the environment 100 of FIG. 1. The augmentation of the object model prepares the telemetry reporter to be able to report concerning telemetry within the scope of the respective subscriptions.

Figure 3:
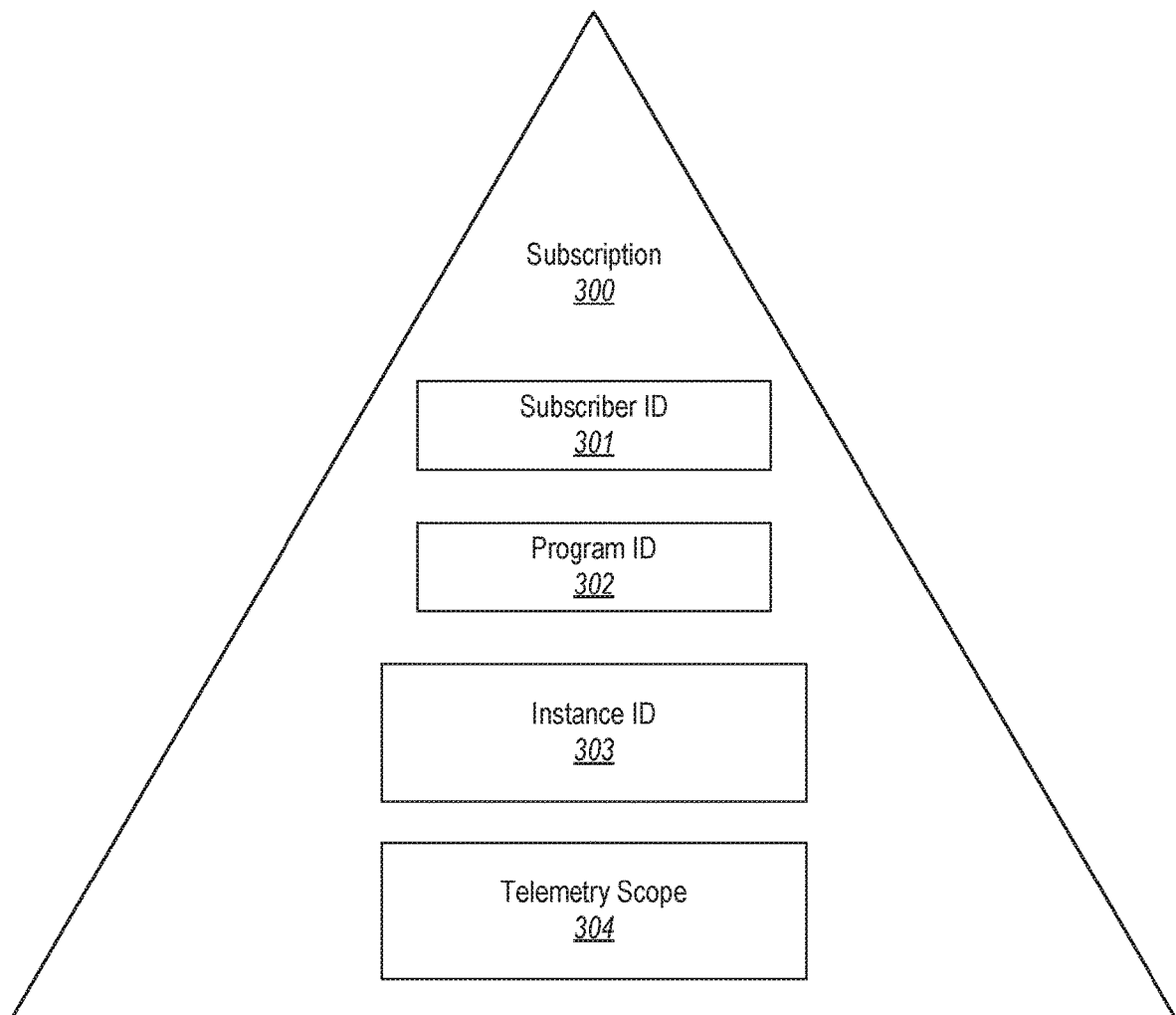
FIG. 3 illustrates an example structure of a subscription for execution telemetry of a software program.

The method 200 includes accessing (act 201) a subscription to telemetry scope of execution of the software program. As an example, in FIG. 1, the telemetry reporter 110 accesses (as represented by arrow 121A) a subscription 120A. FIG. 3 illustrates an example structure of a subscription 300. The subscription 300 includes a subscriber identifier 301 that identifies an entity that is to receive telemetry reports. As an example, if the subscription 120A was the subscription 300, the subscriber identifier 301 would identify the subscriber 130A, and potentially also information that allows telemetry reports to be routed successfully to the subscriber 130A.

In the case of the telemetry reporter providing telemetry for multiple software programs, the subscription 300 may also include a program identifier 302. In the example of FIG. 1, each of the subscriptions 120 are for telemetry of the software program 105. Accordingly, if the subscription 300 was the subscription 120A of FIG. 1, the program identifier 302 would identify the software program 105. Alternatively, if the telemetry reporter 110 only serves a single software program 105, or if the software program 105 is interpreted by default as being the relevant software program absent an identifier, then the subscription 300 need not have the program identifier 302.

The subscription also includes an instance identifier 303 that identifies an execution instance of the software program. As an example, if the software program 105 is a video conferencing application, the execution identifier 303 may be a meeting identifier. Each execution instance has an associated object model that is created beginning at the initiation of the execution.

The subscription 300 also includes a telemetry scope 304 that defines what telemetry should be reported in telemetry reports as part of the subscription 300. The telemetry scope may identify the type of telemetry as well as potentially any rules about how to construct the telemetry and potentially when the telemetry is to be reported.

The subscription 300 may have been created in a response to a user (such as a subscriber) using a dashboard to create a subscription. As an example, in a video conferencing application, the subscriber might use the dashboard to enter the meeting identifier, and then also identify that metric that the subscriber is interested in.

Referring back to the method 200, for the accessed subscription, the telemetry reporter then identifies (act 202) a portion of an object model of the software program that is applicable to the subscribed telemetry scope. When the software model is executed, the execution may create a hierarchical object model that represents a basic state of execution. For example, for a complex video conferencing software program, there may be nodes of the object model that represent the participants, the servers, the media, and other high level aspects of the execution.

The object model may be kept simple compared to the software object model by representing only key aspects of the execution. Thus, the object model does not initially include enough information to derive the telemetry subscribed to by a subscription. As an example, suppose that the subscriber wants to know the average video jitter experienced by all participants of a given server. The object model may have a node representing video of that given server, but may not initially have sufficient detail to determine performance of the video channels from that given server to the various participants connected via that given server.

However, when the subscription is accessed (act 201) and the associated telemetry scope is compared against the object model, the appropriate part of the object model that should be augmented is then identified (act 202). In the example in which a subscriber wants to know the average video jitter experienced by all participants of a given server, that object model portion to be augmented may include the video node for the participant nodes that correspond to the server of interest, as well as potentially the node that represents the server itself, which may be updated with an aggregation of the telemetry augmented into the participant-specific nodes.

Figure 4:
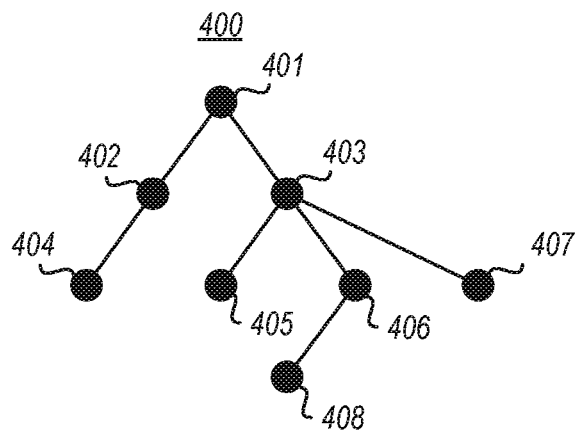
FIG. 4 illustrates an initial object model each in which object model nodes are represented as points and connections between those nodes are represented as lines, and represents an example initial object model prior to augmentation.

FIG. 4 illustrates an initial object model 400 that is kept relatively simple for illustrative purposes. The nodes in the object model 400 are represented as mere dots to represent that the amount of data kept for any given node of the object model may be quite minimal—just enough perhaps to keep execution of the software program proceeding. Since each node may be a minimal representation, even if there are many nodes in the object model (as would be the case for a complex object model), the object model may still be represented and updated without overwhelming computing capacities. Furthermore, the object model 400 may be kept in a distributed fashion. As an example, each server that supports an application might keep that portion of the object model that relates to that server.

Though there may be many nodes in an object model, for illustrative purposes, the object model 400 is shown as having merely eight nodes 401 through 408. In one example referred to herein as the "subject example", the interpretation of the subscription 120A causes the telemetry reporter 200 to determine that it is the nodes 403, 405, 406 and 407 that should be augmented as execution of the software program proceeds.

Figure 5:
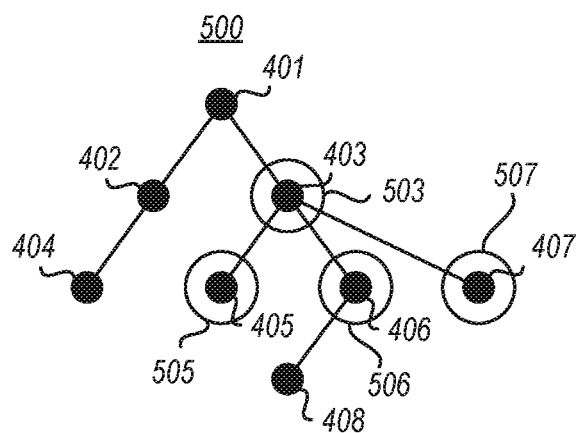
FIG. 5 illustrates the object model of FIG. 4 after some of the nodes of the object model have been augmented, as represented by circles surrounding the corresponding point that represents the node being augmented.

Returning to the method 200, the telemetry reporter then augments (act 203) the portion of the object model through execution of the software program, such that the augmented structure is built upon the object model. As an example, FIG. 5 illustrates an object model 500 that is the same as the object model 400 of FIG. 4, except that there are circles around the nodes 403, 405, 406 and 407 that represents that in the subject example these nodes were augmented with telemetry information as execution of the software program proceeds. The additional structure associated with nodes 403, 405, 406 and 407 are represented by circles 503, 505, 506 and 507. Augmentation of a node of the object model may occur by extending the object model from that node creating new nodes, and/or by augmenting the data associated with the identified node.

Figure 6:
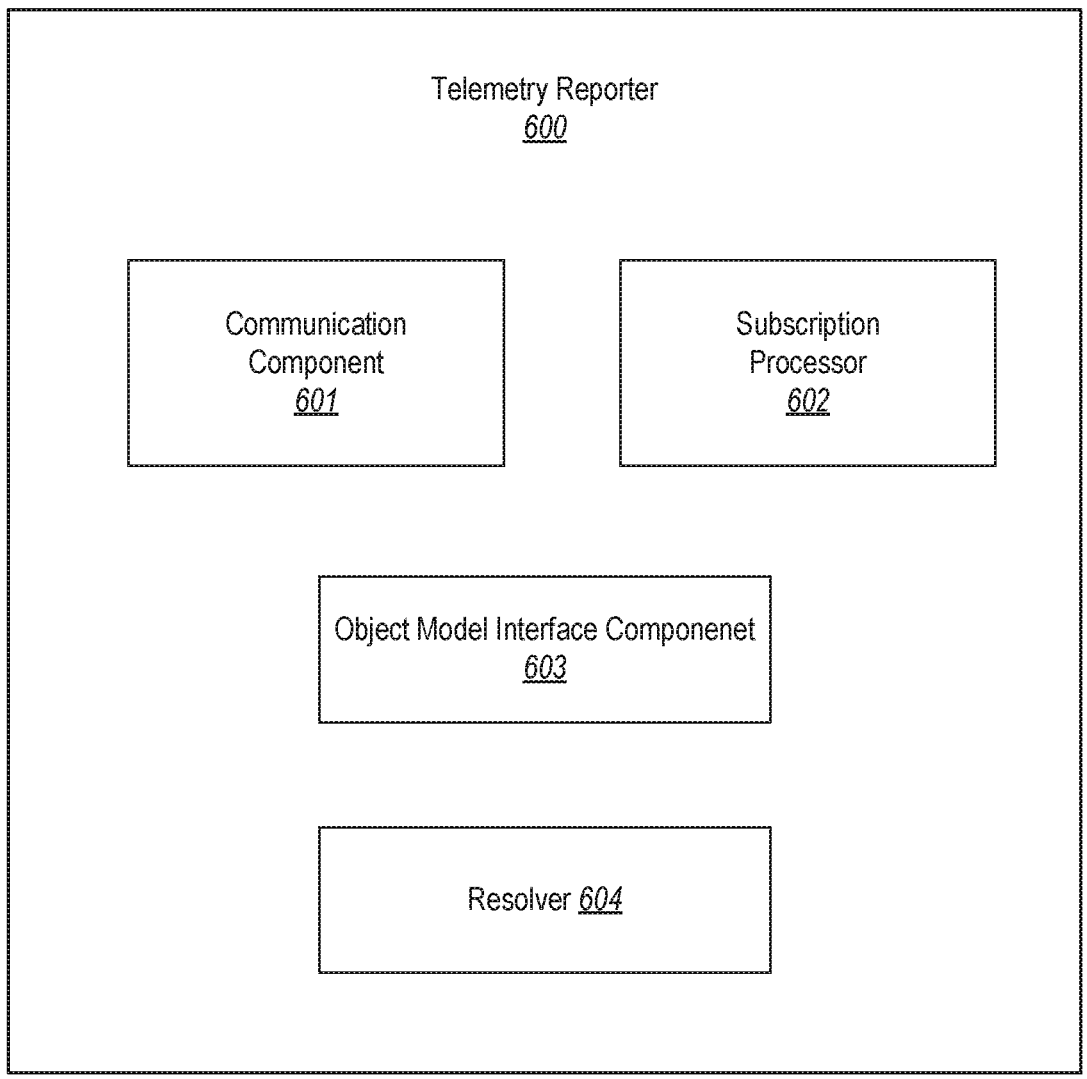
FIG. 6 illustrates a telemetry reporter that represents an example of the telemetry reporter of FIG. 1.

FIG. 6 illustrates a telemetry reporter 600 that represents an example of the telemetry reporter 110 of FIG. 1. The telemetry reporter 600 includes a communication component 601 that is configured to receive the various subscriptions (e.g., act 201), and a subscription processing component 602 that is configured to identify which object model and which portion of the object model should be augmented (e.g., act 202). An object model interface component interfaces with the object model to cause the identified portion of the object model to be augmented with further execution of the associated software program (e.g., act 203). The telemetry reporter 600 also includes a resolver component 604 that automatically resolves any problems reflected in variation of reported telemetry from expected behavior by interacting with the object model at or around the portion that was evaluated to generate the telemetry, and by potentially also interacting with the subscriber. Each of the component 601, 602, 603 and 604 may be structured as described below for the executable component 806 of FIG. 8.

Figure 7:
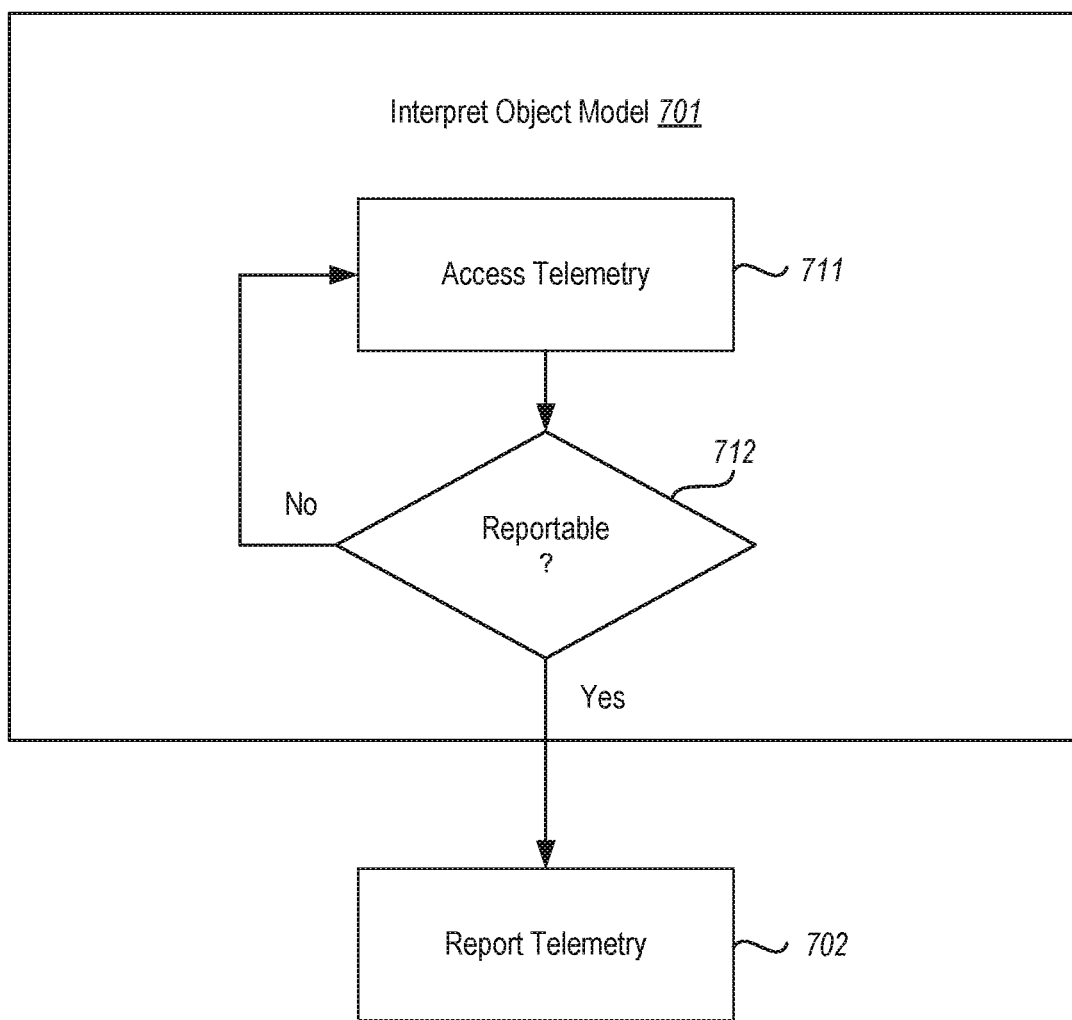
FIG. 7 illustrates a flowchart of a method for reporting telemetry of execution of a software program by interpreting the augmented object model, in accordance with the principles described herein.

Up to this point, the augmentation of the object model has been described. From this point, the using of the augmented object model to report respective telemetry to subscribers will now be described. FIG. 7 illustrates a flowchart of a method 700 for reporting telemetry of execution of a software program by interpreting the augmented object model, in accordance with the principles described herein. The method 700 may be performed by the telemetry reporter 110 of FIG. 1. As a more specific example, the method 700 may be performed by the telemetry reporter 600 of FIG. 6.

The telemetry reporter interprets the augmented object model (act 701). This allows the telemetry reporter to determine the telemetry within the telemetry scope of the subscription (act 711), and to determine whether the telemetry is to be reported in accordance with the subscription (decision block 712). If there is no telemetry to be reported ("No" in decision block 712), then the object model just continues to be augmented and/or updated with new telemetry information. However, if there is telemetry to be reported ("Yes" in decision block 712), then the telemetry reported causes the determined telemetry to be reported in accordance with the subscription (act 703).

The method 700 may be performed multiple times even for a single subscription to thereby send multiple telemetry reports to the subscriber. Thus, the subscriber may receive different sequential values of the determined telemetry. The method 700 may even be continuously performed so that the telemetry reports are streamed to allow the subscriber to see continuously changing values of the telemetry to which the subscriber has subscribed.

Furthermore, the methods 300 and 700 may be performed multiple times for each of multiple subscriptions. An example, in FIG. 1, the method 300 may be performed to access (as represented by arrow 121A) the subscription 120A and cause the appropriate portions of the object model to be augmented, and the method 700 is performed to report (as represented by arrow 131A) respective telemetry report(s) to the subscriber 130A. In addition, the method 300 may be performed to access (as represented by arrow 121B) the subscription 120B and cause the appropriate portions of the object model to be augmented, and the method 700 is performed to report (as represented by arrow 131B) respective telemetry report(s) to the subscriber 130B. Also, the method 300 may be performed to access (as represented by arrow 121C) the subscription 120C and cause the appropriate portions of the object model to be augmented, and the method 700 is performed to report (as represented by arrow 131C) respective telemetry report(s) to the subscriber 130C.

Up to this point, the specific structure of the object model has not been described in detail. This is because the principles described herein are not limited to any particular software program, nor to any manner of constructing an object model from a software program and its execution, nor to the specific design or structure of an object model. However, in one example, the software program is a distributed video conferencing application. In that case, the object may be hierarchically structured with different nodes representing a server (e.g., a virtual machine), a channel (e.g., a video, audio, or data channel) or a participant.

In one embodiment only, the top node in the object model represents a meeting, and thus each meeting in a virtual conferencing application has an associated object model. In the example, the next level is a server (or virtual machine) level. A next level could be a participant level, where a participant node is a child node of the server node that the participant is connected to. The next level could be a channel level in which each node represents a channel (e.g., video, audio, data, control) between the respective participant and the respective server. Each of the nodes may include data associated with that node.

Now suppose in one example that a subscriber wants to see video statistics for participant A. In this case, there is just one node of the object model that is to be augmented. That would be the video channel node that is a child node of the participant node that identifies the associated participant. That node may be augmented with data representing video performance measurements. The telemetry reporter may then monitor the augmented data in that node and apply rules associated with the telemetry scope to verify whether the data should be reported to the subscriber.

In a second example, aggregation of data across multiple nodes is performed. For instance, the subscriber may want a count, average, and/or maximum of the number of participants using a server. In this case, the node that is to be augmented is the node that represents the server. That nodes is then augmented with data over time of the number of participant nodes that are child nodes of that server node. An aggregator can then use that data over time to aggregate the data and send that aggregated data in the report to the subscriber.

Subscriptions can even cause actions to occur in order to generate the data of interest. As an example, a subscription might cause a speed test to be performed periodically to monitor the bitrate speed over a particular connection over time. Thus, the subscriptions may cause the telemetry reporter to affirmatively perform actions in addition to augmenting and interpreting the object model.

Accordingly, the principles described herein allow for prompt reporting of execution telemetry of even complex software programs while the software program is still executing, and potentially in real-time. Because the principles described herein are performed in the context of a computing system, some introductory discussion of a computing system will be described with respect to FIG. 8.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
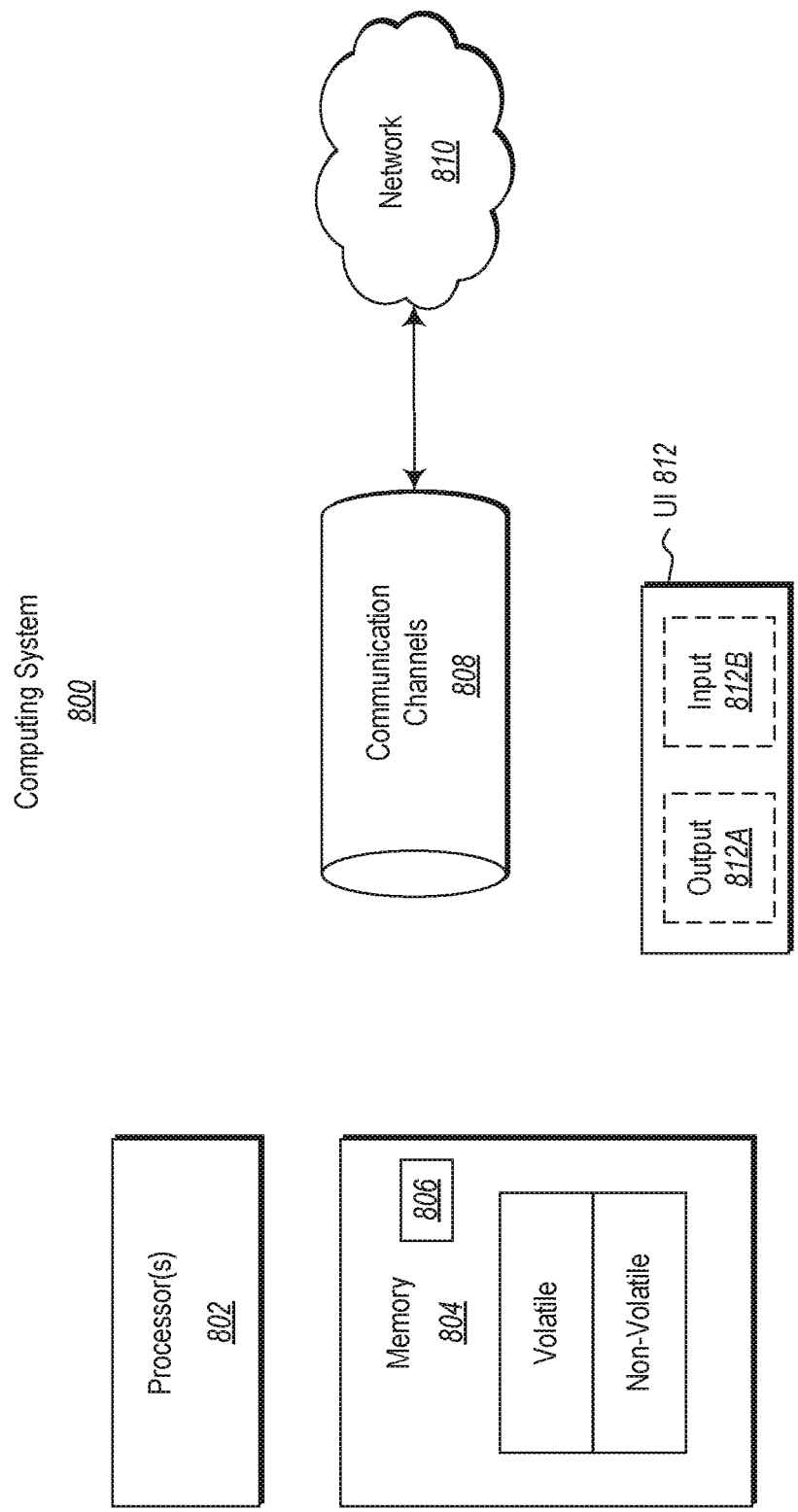
FIG. 8 illustrates an example computing system in which the principles described herein may be employed.

As illustrated in FIG. 8, in its most basic configuration, a computing system 800 includes at least one hardware processing unit 802 and memory 804. The processing unit 802 includes a general-purpose processor. Although not required, the processing unit 802 may also include a field programmable gate array (FPGA), an application specific integrated circuit (ASIC), or any other specialized circuit. In one embodiment, the memory 804 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 800 also has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, virtual or augmented reality, holograms and so forth. Examples of input mechanisms 812B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
one or more processors; and
one or more computer-readable media having thereon computer-executable instructions that are structured such that, if executed by the one or more processors, the computing system would be configured to report telemetry of execution of a software program in response to creation of a portion of an object model, by being configured to perform the following:
accessing a subscription to telemetry scope of execution of the software program;
identifying the portion of the object model that is applicable to the subscribed telemetry scope;
augmenting the portion of the object model through execution of the software program, such that the augmented structure is built upon the object model;
interpreting the augmented structure to determine the telemetry within the telemetry scope of the subscription, and to determine that the telemetry is to be reported in accordance with the subscription; and
in response to determining that the telemetry is to be reported in accordance with the subscription, causing the determined telemetry to be reported in accordance with the subscription.

2. The computing system in accordance with claim 1, the computer-executable instructions being further structured such that, if executed by the one or more processors, the computing system is caused to further report the determined telemetry multiple times for different sequential values of the determined telemetry.

3. The computing system in accordance with claim 1, the software program comprising a video conferencing application.

4. The computing system in accordance with claim 3, the subscription scope being associated with a particular participant or group of participants of the video conferencing application.

5. The computing system in accordance with claim 3, the subscription scope being associated with a particular server of the video conferencing application.

6. The computing system in accordance with claim 3, the subscription scope being associated with a video channel of the video conferencing application.

7. The computing system in accordance with claim 3, the subscription scope being associated with an audio channel of the video conferencing application.

8. The computing system in accordance with claim 3, the subscription scope being associated with a data channel of the video conferencing application.

9. The computing system in accordance with claim 1, the telemetry being an aggregation of parameters within the subscription scope.

10. A computing system comprising:
one or more processors; and
one or more computer-readable media having thereon computer-executable instructions that are structured such that, if executed by the one or more processors, the computing system would be configured to report telemetry of execution of a software program in response to creation of a portion of an object model, by being configured to instantiate and/or operate the following:

a communication component configured to access subscription to telemetry scope of execution of the software program;

a processing component configured to identify the portion of the object model that is applicable to the subscribed telemetry scope; and an object model interface component configured to cause the portion of the object model to be augmented through execution of the software program, such that an augmented structure is built upon the object model and further configured to interpret the augmented structure to determine the telemetry within the telemetry scope of the subscription, and to determine that the telemetry is to be reported in accordance with the subscription, the communication component being further configured to, in response to determining that the telemetry is to be reported in accordance with the subscription, cause the determined telemetry to be reported in accordance with the subscription.

11. The computing system in accordance with claim 10, the software program being a video conferencing application.

12. A computer-implemented method for reporting telemetry of execution of a software program, the method comprising:

accessing, by a communication component, a subscription to telemetry scope of execution of the software program;

identifying, by a processing component, a portion of an object model that is applicable to the subscribed telemetry scope;

augmenting, by an object model interface component, the portion of the object model through execution of the software program, such that the augmented structure is built upon the object model;

interpreting, by the object model interface component, an augmented structure to determine the telemetry within the telemetry scope of the subscription, and to determine that the telemetry is to be reported in accordance with the subscription; and in response to determining that the telemetry is to be reported in accordance with the subscription, causing the communication component to reported the determined telemetry in accordance with the subscription.

13. The method in accordance with claim 12, further comprising reporting the determined telemetry multiple times for different sequential values of the determined telemetry.

14. The method in accordance with claim 12, the software program comprising a video conferencing application.

15. The method in accordance with claim 14, the subscription scope being associated with a particular participant or group of participants of the video conferencing application.

16. The method in accordance with claim 14, the subscription scope being associated with a particular server of the video conferencing application.

17. The method in accordance with claim 14, the subscription scope being associated with a video channel of the video conferencing application.

18. The method in accordance with claim 14, the subscription scope being associated with an audio channel of the video conferencing application.

19. The method in accordance with claim 14, the subscription scope being associated with a data channel of the video conferencing application.

20. The method in accordance with claim 12, the telemetry being an aggregation of parameters within the subscription scope.

\* \* \* \* \*